United States Patent [19]

Hudson

[11] Patent Number: 5,429,700
[45] Date of Patent: Jul. 4, 1995

[54] WATERPROOF ART

[75] Inventor: Robert L. Hudson, Ventura, Calif.

[73] Assignee: The Splash Art Company, Ventura, Calif.

[21] Appl. No.: 215,856

[22] Filed: Mar. 15, 1994

Related U.S. Application Data

[63] Continuation-in-part of Ser. No. 538,079, Jun. 14, 1990, abandoned.

[51] Int. Cl.⁶ .................. B32B 3/10; B32B 31/18
[52] U.S. Cl. .................. 156/253; 156/92;
156/256; 281/38; 283/107; 283/111; 283/61;
402/79; 40/158.1; 40/597
[58] Field of Search .............. 156/253, 252, 250, 256,
156/267, 92, 292, 101, 277; 40/158.1, 597;
428/99; 281/38; 283/61, 107, 111; 402/79

[56] References Cited

U.S. PATENT DOCUMENTS

| | | | |
|---|---|---|---|
| 2,143,608 | 1/1939 | Morris | 40/154 |
| 2,314,803 | 3/1943 | Wagner et al. | 156/92 X |
| 2,419,357 | 4/1947 | Krasner et al. | 156/253 X |
| 2,488,317 | 11/1949 | Murray | 156/253 |
| 2,616,823 | 11/1952 | Weymouth | 156/253 X |
| 2,801,948 | 8/1957 | Walker | 156/66 |
| 3,498,788 | 3/1970 | Haas | 283/109 X |
| 3,505,140 | 4/1970 | Dunn | 283/109 X |
| 3,738,903 | 6/1973 | Berwick et al. | 156/253 X |
| 4,171,584 | 10/1979 | Kaiser | 40/490 |
| 4,536,423 | 8/1985 | Travis | 40/594 X |
| 4,696,711 | 9/1987 | Greszczuk | 156/253 X |
| 4,718,962 | 1/1988 | Goodwin | 402/79 X |
| 4,961,666 | 10/1990 | Pitts et al. | 402/79 |
| 5,074,593 | 12/1991 | Grosso | 283/109 X |

FOREIGN PATENT DOCUMENTS 547946 11/1958 Italy .
594610 11/1947 United Kingdom .

Primary Examiner—Michael W. Ball
Assistant Examiner—Francis J. Lorin
Attorney, Agent, or Firm—Marvin E. Jacobs

[57] ABSTRACT

A sealed aperture is formed in a laminated assembly by prepunching a central sheet such as a paper art print to form a first aperture and then laminating the art print between two sheets of laminating film to form a laminated assembly in which the two films are fused together in the aperture to form a single film in the form of a disc. A second aperture is then punched through the disc having a smaller diameter than the film aperture such that a sealed border remains between the second aperture and the first aperture.

13 Claims, 1 Drawing Sheet

WATERPROOF ART

CROSS-REFERENCE TO RELATED APPLICATION

This application is a continuation-in-part of Ser. No. 07/538,079, filed Jun. 14, 1990, now abandoned.

TECHNICAL FIELD

The present invention relates to waterproof art and, more particularly, this invention relates to improved means for hanging waterproof art on the walls of shower and bath enclosures.

BACKGROUND OF THE INVENTION

Art reproductions are widely used as wall decorations. Recently, waterproof art for hanging on walls of showers and bathtubs have been introduced. The art work can be portraits, paintings, still life or charts such as fanciful alphabets or games. The art work is generally lithographs on substrates such as paper that are degraded by contact with moisture.

STATEMENT OF THE PRIOR ART

The art work can be protected by encapsulation as described in U.S. Pat. No. 4,536,423, by E. C. Travis. In the Travis patent the waterproofed encapsulated art work is hung on the wall of a shower or tub enclosure by adhesive strips adhered to the back of the art work. However, the strips of adhesive collect dust, grime and are a center for fungus growth. Furthermore, the adhesive tape does not reliably adhere to smooth tile walls of showers. The tape releases from the wall.

In my earlier application Ser. No. 07/538,079, I describe a waterproof art product which eliminates the use of adhesive. Holes are punched through the corners of the laminate and the art work is suspended by suction cups having a stem which is received in the holes. The outer end of the stem can have a hook or bulbous end to prevent the art work from falling off the stem.

The suction cups firmly and reliably adhere to the smooth ceramic, porcelain or painted metal walls of a shower or tub enclosure. In fact, suction cups adhere better to smooth, non-porous walls. If the walls are formed of porous masonry or rough surfaces, the surface behind the suction cup can be sealed with an adhesive patch of smooth plastic as disclosed in U.S. Pat. No. 5,047,102, the disclosure of which is expressly incorporated herein by reference. No fungus or mold is found to form on or under the suction cup after several months of residence in a shower enclosure.

However, the waterproof envelope of art work is now not continuous since the top and bottom films are breached to form the apertures for hanging the assembly. It is found that some of the apertures are not totally sealed during lamination of the assembly. Water enters the envelope and is absorbed by and spots the absorbent print.

STATEMENT OF THE INVENTION

Incomplete sealing of the apertures is eliminated in accordance with this invention by prestamping the art print to form a first set of apertures. The perforated print is then assembled between opposed sheets of thermoplastic laminating material and the assembly is laminated such that the perimeter edges seal and the sheets laminate to each other through the apertures in the print. The laminated apertures are then stamped with a second aperture having a smaller diameter than the aperture in the print leaving a laminated, sealed, annular ring.

These and many other features and attendant advantages of the invention will become apparent as the invention becomes better understood by reference to the following detailed description when considered in conjunction with the accompanying drawings.

DETAILED DESCRIPTION OF THE INVENTION

Figure 1:
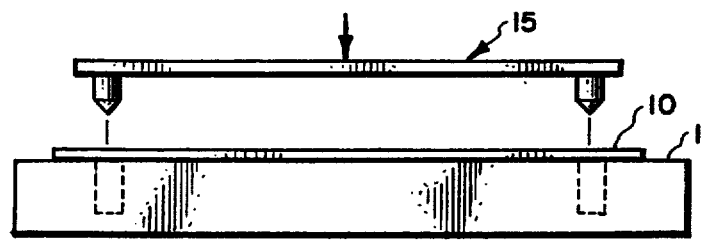
FIG. 1 is a schematic view of a station in a production line for prepunching an aperture through a sheet of art work.
Figure 2:
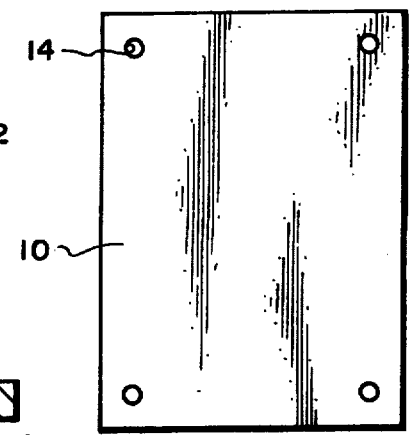
FIG. 2 is a top view of an art print having four apertures.

Referring now to FIGS. 1 and 2, an art print 10 is placed on a surface 12 and at least one aperture 14 is punched through the print 10, usually at least two and typically four in the case of rectangular prints, by means of a punching tool 15. The apertures are generally ½ to 2 inches from the corner of rectangular prints and the apertures are usually circular and generally have a diameter from ½ to 2 inches.

Figure 4:
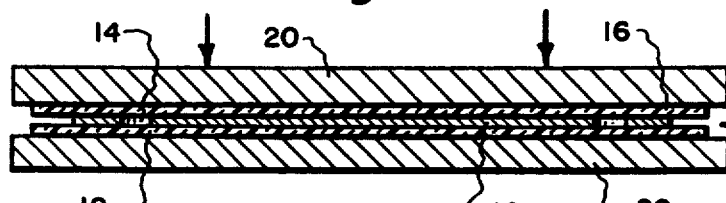
FIG. 4 is a schematic view of the assembly of FIG. 3 shown in section disposed in a laminating press.
Figure 3:
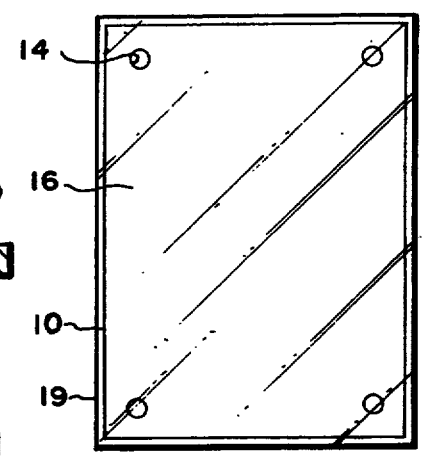
FIG. 3 is a top view of the art print of FIG. 2 placed between 2 sheets of thermoplastic material.

As shown in FIGS. 3-4, the print 10 is placed between a front film 16 and a back film 18 of thermoplastic to form an assembly 17. The films 16, 18 are longer and wider than the print 10 by at least 1/16 of an inch to form overlapping borders 19. The thermoplastic laminating films are flexible, have a melting temperature below the temperature at which the print melts or chars and readily fuse to each other. The front film should have good transparency and not visually distort the print. Preferred materials are vinyl resins or polyalkylene resins such as polyethylene, polypropylene or polybutylene. Polypropylene films having thicknesses from 1 to 10 mils are preferred for forming durable, flexible laminates. As shown in FIG. 4, when heat and pressure are applied to the assembly 17 from platens 20, 22 the films 16, 18 melt to form fused borders 24 and fused and sealed discs 26 within the apertures 14.

Figure 5:
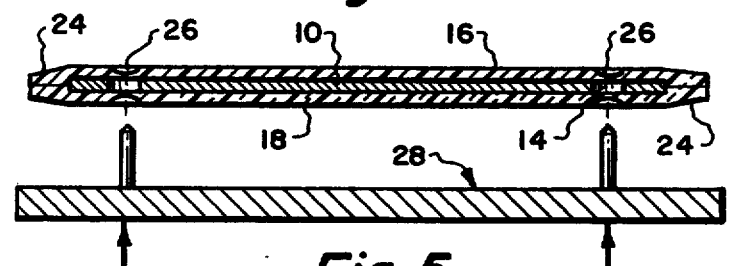
FIG. 5 is an enlarged side view of one of the laminated apertures of the assembly of FIG. 4 shown in schematic relation to a punching apparatus.
Figure 6:
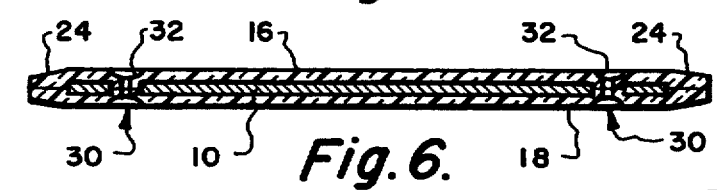
FIG. 6 is an enlarged view of the sealed aperture.

The discs 26 are then punched by means of the punching tool 28 as shown in FIGS. 5 and 6 to form apertures 30 having a diameter smaller than the apertures 14 in the print 10. A sealed annular rim 32 remains, sealing the print from ingress of water.

Figure 7:
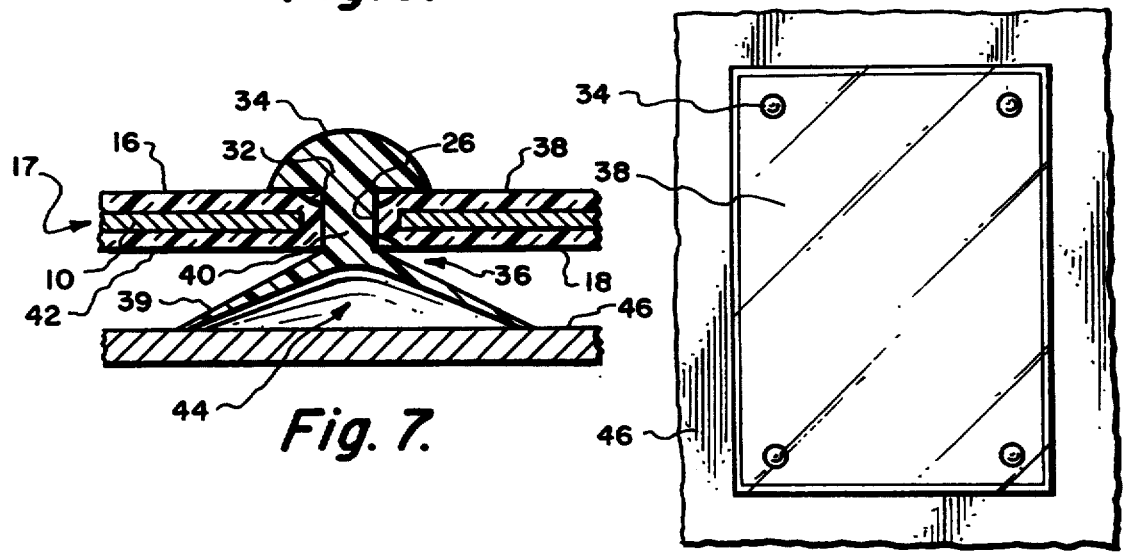
FIG. 7 is a schematic view of the insertion of a suction cup into one of the sealed apertures.
Figure 8:
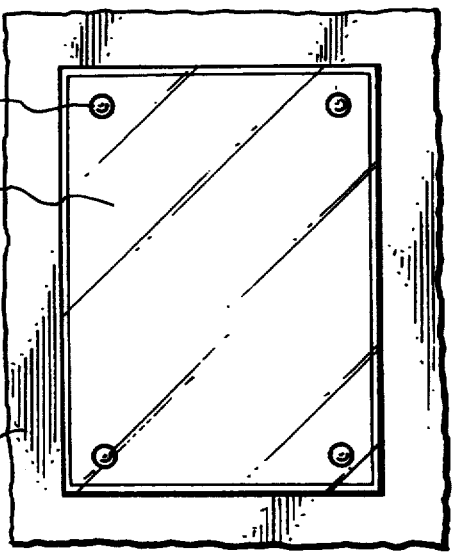
FIG. 8 is front view of the laminated, sealed art print adhered to a tile wall.

As shown in FIGS. 7 and 8, the cap end 34 of a suction cup hanger 36 is pushed through the back of the aperture 30 such that the cap engages the front wall 38 of the assembly 17. The stem 40 is disposed in the aperture 30 and the suction cup 39 is disposed on the back wall 42 of the assembly 17. The open end 44 of the suction cup engages a tile wall 46 as shown in FIGS. 7 and 8. It has been found that the suction cups made out of polyurethane resin have exceptional ability to prevent microbial growth. The art prints can be of any size. Prints 1–3 feet wide and from 1 to 5 feet long have been readily accepted in the marketplace.

The suction cups can be installed in the apertures by placing a hollow, cylindrical rod over the button and forcing the flexible button through the aperture. The suction cups could also be thermally bonded or adhesively adhered to the rear surface of the laminate. Suction cups having a feathered, thinner edge exhibit better adherence to tile surfaces. The apertures could be formed by other techniques such as drilling or laser vaporization.

The invention can be used to form a seal on any aperture formed in a laminated assembly irrespective of whether it is used in a shower or tub. The final laminated print can be hung by hooks, nails or other fasteners to any wall surface.

It is to be realized that only preferred embodiments of the invention have been described and that numerous substitutions, modifications and alterations are permissible without departing from the spirit and scope of the invention as defined in the following claims.

I claim:

1. A method of forming sealed apertures in a rectangular, laminated assembly containing a central, decorated art print on a substrate that is degraded by contact with water comprising the step of:
   forming a plurality of first apertures having a first diameter adjacent corners of the substrate, at least two of the apertures being on the same side of the rectangular substrate;
   placing the apertured substrate between a front transparent sheet of laminatible plastic and a rear sheet of laminatible plastic, said sheets being longer and wider than the art print to form an assembly:
   laminating the assembly whereby two sheets join to form a sealed, waterproof perimeter border and a sealed single film within each of the first apertures; and
   removing the central portion of the single film within the apertures to form a second aperture having a diameter smaller than the diameter of the first aperture for receiving the shaft of a hanging member and to form a sealed waterproof annular rim border of said single film adjacent the perimeter edge of the first aperture.

2. A method according to claim 1 which the apertures are circular.

3. A method according to claim 1 further including the step of installing a suction cup hanger in said aperture.

4. A method according to claim 3 in which the hanger member is a suction cup having a cup and button connected by a hanging member shaft.

5. A method according to claim 3 in which the suction cups are formed of polyurethane.

6. A method according to claim 1 in which the art print is printed on paper.

7. A method according to claim 1 in which the front and rear sheets are formed of thermoplastic resins.

8. A method according to claim 7 in which the thermoplastic resins are selected from vinyl resins and resins of alkylene monomers containing 2–8 carbon atoms.

9. A method according to claim 8 in which the resin is polypropylene.

10. A method according to claim 3 in which the central portion of the single film in the aperture is removed by punching.

11. A method according to claim 1 in which the first apertures have a diameter from ½ inch to 2 inches.

12. A method according to claim 1 in which the sealed, waterproof border is at least 1/16 inch wide.

13. A method according to claim 1 in which the first apertures are located from ½ to 2 inches from the corners of the art print.

* * * * *